(12) United States Patent
Takaoka

(10) Patent No.: US 10,594,497 B2
(45) Date of Patent: Mar. 17, 2020

(54) SEMICONDUCTOR DEVICE

(71) Applicant: Renesas Electronics Corporation, Tokyo (JP)

(72) Inventor: Hiromichi Takaoka, Hitachinaka (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 268 days.

(21) Appl. No.: 15/839,634

(22) Filed: Dec. 12, 2017

(65) Prior Publication Data

US 2018/0205563 A1     Jul. 19, 2018

(30) Foreign Application Priority Data

Jan. 13, 2017   (JP) ................. 2017-004464

(51) Int. Cl.
    *H04L 9/32*     (2006.01)
    *H04L 9/08*     (2006.01)
    *G09C 1/00*     (2006.01)
    *H03K 3/84*     (2006.01)

(52) U.S. Cl.
CPC .............. *H04L 9/3278* (2013.01); *G09C 1/00* (2013.01); *H03K 3/84* (2013.01); *H04L 9/0866* (2013.01); *H04L 9/3242* (2013.01)

(58) Field of Classification Search
CPC ....... H04L 9/3278; H04L 9/0866; G09C 1/00; H03K 3/84
USPC ........................................... 256/124
See application file for complete search history.

(56) References Cited

U.S. PATENT DOCUMENTS

| 8,347,091 | B2 | 1/2013 | Nonaka et al. |
| 9,729,324 | B2 | 8/2017 | Yamamoto et al. |
| 2016/0182045 | A1* | 6/2016 | Mai .......................... G09C 1/00 326/8 |
| 2017/0092601 | A1* | 3/2017 | Okagaki ............. H01L 27/0207 |

FOREIGN PATENT DOCUMENTS

| JP | 2015-139010 A | 7/2015 |
| WO | WO 2008/056612 A1 | 5/2008 |

* cited by examiner

*Primary Examiner* — Igwe U Anya
(74) *Attorney, Agent, or Firm* — McDermott Will & Emery LLP

(57) ABSTRACT

A semiconductor device includes a first field effect transistor and a second field effect transistor which are respectively coupled to gate electrodes. An insulation property of a gate insulating film of the first field effect transistor is broken down. A resistance value of the gate insulating film of the second field effect transistor is greater than a resistance value of the gate insulating film of the first field effect transistor.

15 Claims, 11 Drawing Sheets

SEMICONDUCTOR DEVICE

CROSS-REFERENCE TO RELATED APPLICATIONS

The disclosure of Japanese Patent Application No. 2017-004464 filed on Jan. 13, 2017 including the specification, drawings and abstract is incorporated herein by reference in its entirety.

BACKGROUND

The present invention relates to a semiconductor device, and relates, for example, to an effective technique applicable to a semiconductor device having a function for generating a PUF (Physically Unclonable Function) as peculiar information peculiar to the semiconductor device.

WO 2008/056612 discloses a technique for correcting a "PUF" by using an error correction encoding technique, when an error occurs in the generated "PUF".

Japanese Unexamined Patent Application Publication No. 2015-139010 discloses a technique for generating a "PUF" by using a characteristic change of a gate insulating film by hot carriers, for an intentionally selected device.

SUMMARY

For example, to identify a manufacturer of the semiconductor device, there is a technique using the "PUF" as peculiar information peculiar to the semiconductor device. This "PUF" is a function for outputting information which is different between semiconductor devices, using the individual differences of the semiconductor devices. In this specification, the peculiar information generated by this function and peculiar to each semiconductor device is called a "PUF".

As the "PUF", there is provided a silicon-made "PUF" (Silicon-PUF). Examples thereof are an SRAM-PUF and an Arbiter-PUF. The SRAM-PUF uses "0/1" which is easily settled for each cell at the initialization of the SRAM, while the Arbiter-PUF uses the variation of delay circuits.

The "PUF" has a function for identifying the manufacturer of the semiconductor device, is required not to be subject to a change with time or surrounding environment, and is required to have uniqueness. That is, the "PUF" is required to have reproducibility and uniqueness.

For this point, the "PUF" using a delicate manufacturing variation generated in a manufacturing process has uniqueness, because it is possible to provide different information between semiconductor devices due to different manufacturing variations between the semiconductor devices. The SRAM-PUF or Arbiter-PUF using a delicate manufacturing variation generated in the manufacturing process has a problem that it is difficult to realize reproducibility due to the operation environment or use history. That is, the current technique has a room for improvement for realizing the "PUF" including both the reproducibility and uniqueness. Therefore, it is demanded to provide the "PUF" including both the reproducibility and uniqueness.

Other problems and new features will be apparent from the descriptions of this specification and the accompanying drawings.

The semiconductor device according to an embodiment includes a first field effect transistor and a second field effect transistor which are electrically coupled to each other. An insulation property of a first gate insulating film of the field effect transistor is broken. A resistance value of a second gate insulating film of the field effect transistor is greater than a resistance value of the first gate insulating film.

The semiconductor device according to the embodiment includes an anti-fuse having the first field effect transistor and the second field effect transistor.

According to the embodiment, it is possible to provide a semiconductor device which can generate a "PUF" having excellent reproducibility and uniqueness.

DESCRIPTION

Figure 1:
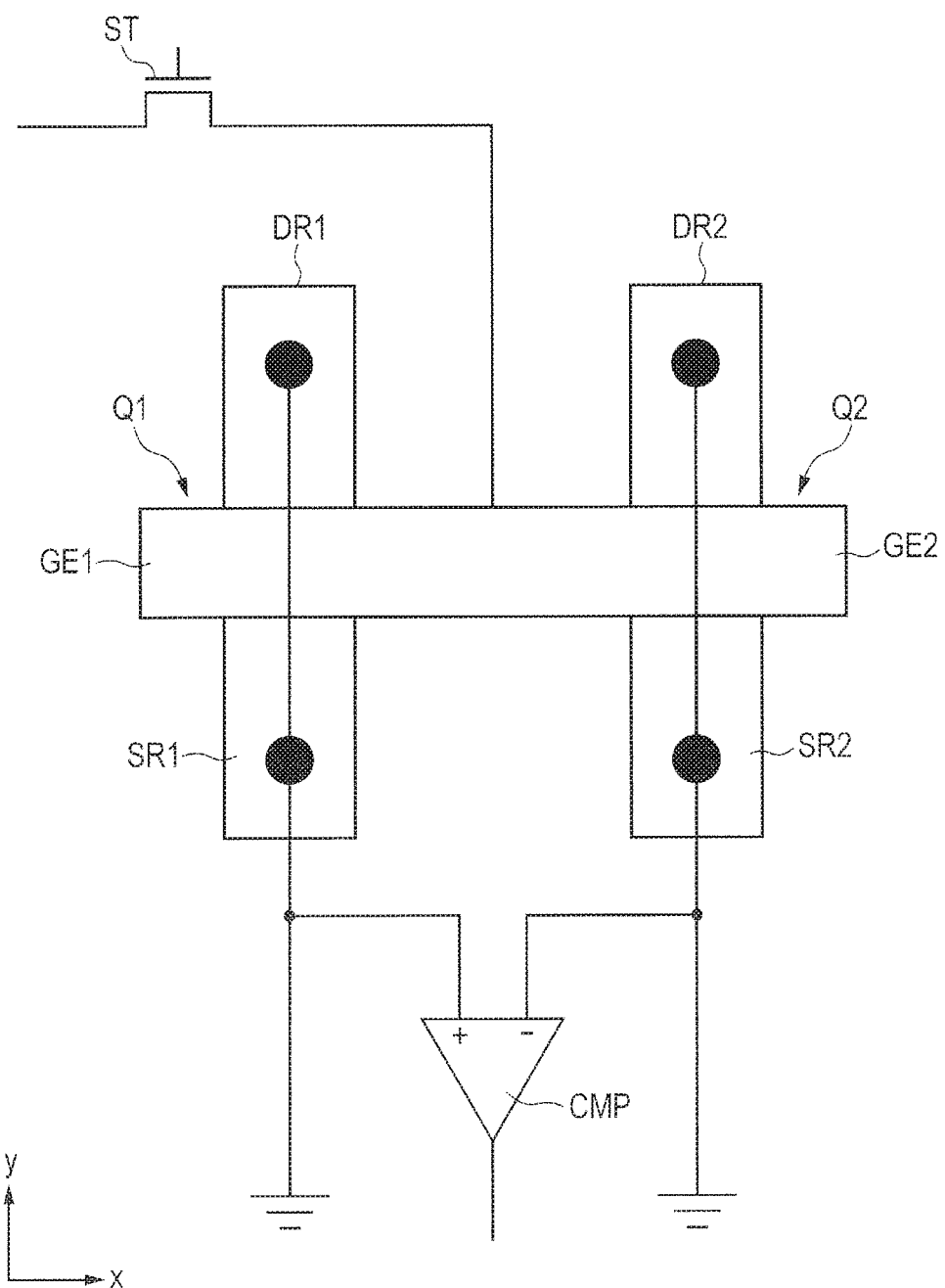
FIG. 1 is a schematic diagram illustrating a plane configuration of a semiconductor device in an embodiment 1.

In the following preferred embodiments, if necessary for convenience sake, descriptions will be made to divided plural sections or preferred embodiments, however, unless otherwise specified, they are not mutually irrelevant, but one is in relations of modifications, details, supplementary explanations of a part or whole of the other.

Further, in the following preferred embodiments, in the case of reference to the number of elements (including the quantity, numeric value, amount, range), unless otherwise specified and unless clearly limited in principle, the present invention is not limited to the specified number, and a number over or below the specified one may be used.

In the following preferred embodiments, the constituent elements (including the element steps) are not necessarily indispensable, unless otherwise specified and unless considered that they are obviously required in principle.

Similarly, in the following preferred embodiments, in the reference of the forms of the constituent elements or the positional relationships, they intend to include those approximating or similar substantially to the forms and like, unless otherwise specified and unless considered that they are obviously not required in principle. This is also true of the foregoing numerical values and the range.

In the drawings below for explaining the preferred embodiments, the same constituent elements are identified by the same reference symbols, and thus may not be described over and over as needed. For the sake of easy understanding of the drawings, hatching may be given even into the plan view.

Embodiment 1

<Basic Idea in Embodiment 1>

Descriptions will now be made to the basic idea of the embodiment 1. The basic idea of the embodiment 1 is a technical idea for generating a "PUF" which is less subject to the effect of a change with time or the surrounding environment, by enhancing a difference in characteristic values as a result of a manufacturing variation, without generating a "PUF" as information peculiar to the semiconductor device, with using a difference in characteristic values as is as a result of the manufacturing variation which is subject to the effect of the change with time or the surrounding environment.

Specifically, in this embodiment 1, on the assumption that the individual semiconductor devices include a plurality of gate insulating films having a manufacturing variation, insulation breakdown resulting from the manufacturing variation is caused to occur in a part of the gate insulating films. As a result of this, a resistance difference of the gate insulating films is enhanced greatly than the case where the insulation breakdown is not caused to occur. In this embodiment 1, the "PUF" is generated, based on the enhanced resistance difference of the gate insulating films.

To clearly describe this, as an example of the gate insulating films, two gate insulating films will be described. For example, in general, the two gate insulating films have delicately different thicknesses and different numbers of defects, due to the manufacturing variation in the manufacturing process. In this case, as a result of delicately different thicknesses and different numbers of defects, the two gate insulating films may have delicately different resistance values, and the resistance difference of the two gate insulating films is very small. Thus, this very small resistance difference in the two gate insulating films is subject to the effect of the change with time or the surrounding environment. When the "PUF" is generated using the resistance difference of the two gate insulating films which results from the manufacturing variation as is, it is difficult to generate the "PUF" which is less subject to the effect of the change with time or the surrounding environment.

For example, it is assumed to form a "PUF", by giving "1", when the resistance value of one gate insulating film of the two gate insulating films is smaller than the resistance value of the other gate insulating film, and by giving "0", when the resistance value of the other gate insulating film is greater than the resistance value of the one gate insulating film. In this case, as a result of a very small resistance difference(s) of the two gate insulating films, the relation of the resistance differences of the two gate insulating films is inverted due to the effect of a change with time and the surrounding environment. This easily causes inversion of "1" and "0" forming the "PUF". This implies low reproducibility of the "PUF". That is, when the "PUF" is generated using as is the resistance difference of the two gate insulating films due to the manufacturing variation of the two gate insulating films, it is difficult to generate a "PUF" having high reproducibility and being less subject to the effect of the change with time or surrounding environment.

In this embodiment 1, insulation breakdown of the gate insulating film is focused. That is, due to the difference in the film thickness or the number of defects resulting from the manufacturing variation, it is assumed that the two gate insulating films have different resistance values, and that the resistance difference of the two gate insulating films is very small. For this point, the present inventors have focused on a very small difference in the withstand voltages of the two gate insulating films for insulation breakdown, owing to the difference in the film thickness and the number of defects due to the manufacturing variation. That is, the present inventors have focused on that insulation breakdown does not occur in one gate insulating film with high withstand voltage for insulation breakdown, while insulation breakdown occurs in the other gate insulating film with low withstand voltage for insulation breakdown, due to the difference in the withstand voltage of the two gate insulating films for insulation breakdown, even if the same breakdown voltage is applied to the two gate insulating films. This is because insulation breakdown of the gate insulating film implies that a current path is generated in the gate insulating film, and thus the resistance value of the gate insulating film where the insulation breakdown has occurred is remarkably smaller than the resistance value of the gate insulating film where no insulation breakdown has occurred. That is, by causing occurrence of insulation breakdown in one gate insulating film of the two gate insulating films, it is possible to remarkably increase the resistance difference of the two gate insulating films, as compared with the case where insulation breakdown is not caused to occur.

Intentional determination is not made as to which gate insulating film of the two gate insulating films is a target film for insulation breakdown. This determination is randomly made, resulting from the manufacturing variation. That is, determination as to which gate insulating film of the two gate insulating films is the target film for insulation breakdown is made based on the manufacturing variation.

Therefore, it is assumed that, in one semiconductor device, insulation breakdown occurs in one gate insulating film of two gate insulating films, while in another semiconductor device, insulation breakdown occurs in the other gate insulating film of the two gate insulating films. That is, because the manufacturing variations differ in the two gate insulating films formed in the individual semiconductor devices, occurrence of insulation breakdown in either gate insulating film of the two gate insulating films depends on the manufacturing variation of the two gate insulating films in the individual semiconductor devices. Based on this phenomenon, for example, insulation breakdown occurs in one gate insulating film, thereby giving "1" when the resistance value of the one gate insulating film is smaller than the resistance value of the other gate insulating film without insulation breakdown. Insulation breakdown occurs in the other gate insulating film, thereby giving "0" when the resistance value of the one gate insulating film is greater than the other gate insulating film. In this case, the "PUF" can be generated based on this "0/1" information. In fact, a set of two gate insulating films is assumed as one cell, and a plurality of cells are prepared. It is possible to obtain information arrays peculiar to the individual semiconductor devices, by combining "0/1s" output from the cells. This information array can be used as the "PUF".

The basic idea of this embodiment 1 is for remarkably enhancing a difference of resistance values of the two gate insulating films, by causing insulation breakdown in either gate insulating film of the two gate insulating films, without generating the "PUF" as information peculiar to the semiconductor device, using as is the difference of the resistance values of the two gate insulating films as a result of the manufacturing variation which is subject to the effect of change with time or surrounding environment. According to this basic idea, because the difference of the resistance values of the two gate insulating films becomes large, it is possible to suppress inversion of the difference relation of the resistance values of the two gate insulating films due to the effect of the change with time or surrounding environment. According to the basic idea of the embodiment 1, this implies that it is possible to improve reproducibility of the "PUF" generated based on the difference of the resistance values of the two gate insulating films. This results in generating the "PUF" which is less subject to the effect of the change with time and the surrounding environment.

As described above, the basic idea of the embodiment 1 is made on the assumption that the gate insulating films having the manufacturing variation are included in the semiconductor device. The semiconductor device embodying the basic idea of the embodiment 1 has an enhancement unit (a part where insulation breakdown occurs) for increasing the resistance difference of the gate insulating films, than the case without occurrence of insulation breakdown, by causing insulation breakdown due to the manufacturing variation, in one gate insulating film of the gate insulating films. Further, the semiconductor device embodying the basic idea of this embodiment 1 has a peculiar information generation unit which generates peculiar information for specifying the semiconductor device, based on the resistance difference of the gate insulating films which is enhanced by the above-described enhancement unit. Descriptions will hereinafter be made to a specific configuration example embodying the basic idea of the embodiment 1.

<Configuration of Semiconductor Device>
<<Plan View Configuration of Semiconductor Device>>

FIG. 1 is a schematic diagram illustrating a plane configuration of the semiconductor device in the embodiment 1. As illustrated in FIG. 1, the semiconductor device in the embodiment 1 has a field effect transistor Q1 and a field effect transistor Q2. A gate electrode GE1 of the field effect transistor Q1 and a gate electrode GE2 of the field effect transistor Q2 are electrically coupled to each other, and the gate electrode GE1 and the gate electrode GE2 are incorporated together to extend in an x-direction. As illustrated in FIG. 1, in the field effect transistor Q1, in plan view, a source region SR1 and a drain region DR1 are formed in a manner that the gate electrode GE1 is sandwiched therebetween. At this time, the source region SR1 of the field effect transistor Q1 and the drain region DR1 of the field effect transistor Q1 are electrically coupled to each other, are electrically coupled to the ground, and are coupled to a first input unit (+) of a comparator CMP.

In the field effect transistor Q2, in plan view, a source region SR2 and a drain region DR2 are formed in a manner that the gate electrode GE2 is sandwiched therebetween. At this time, the source region SR2 of the field effect transistor Q2 and the drain region DR2 of the field effect transistor Q2 are electrically coupled to each other, are electrically coupled to the ground, and are coupled to a second input unit (−) of the comparator CMP.

As illustrated in FIG. 1, the gate electrode GE1 of the field effect transistor Q1 and the gate electrode GE2 of the field effect transistor Q2 are electrically coupled to a selection transistor ST. As described above, the semiconductor device in the embodiment 1 is configured in plan.

<<Cross Sectional Configuration of Semiconductor Device>>

Figure 2:
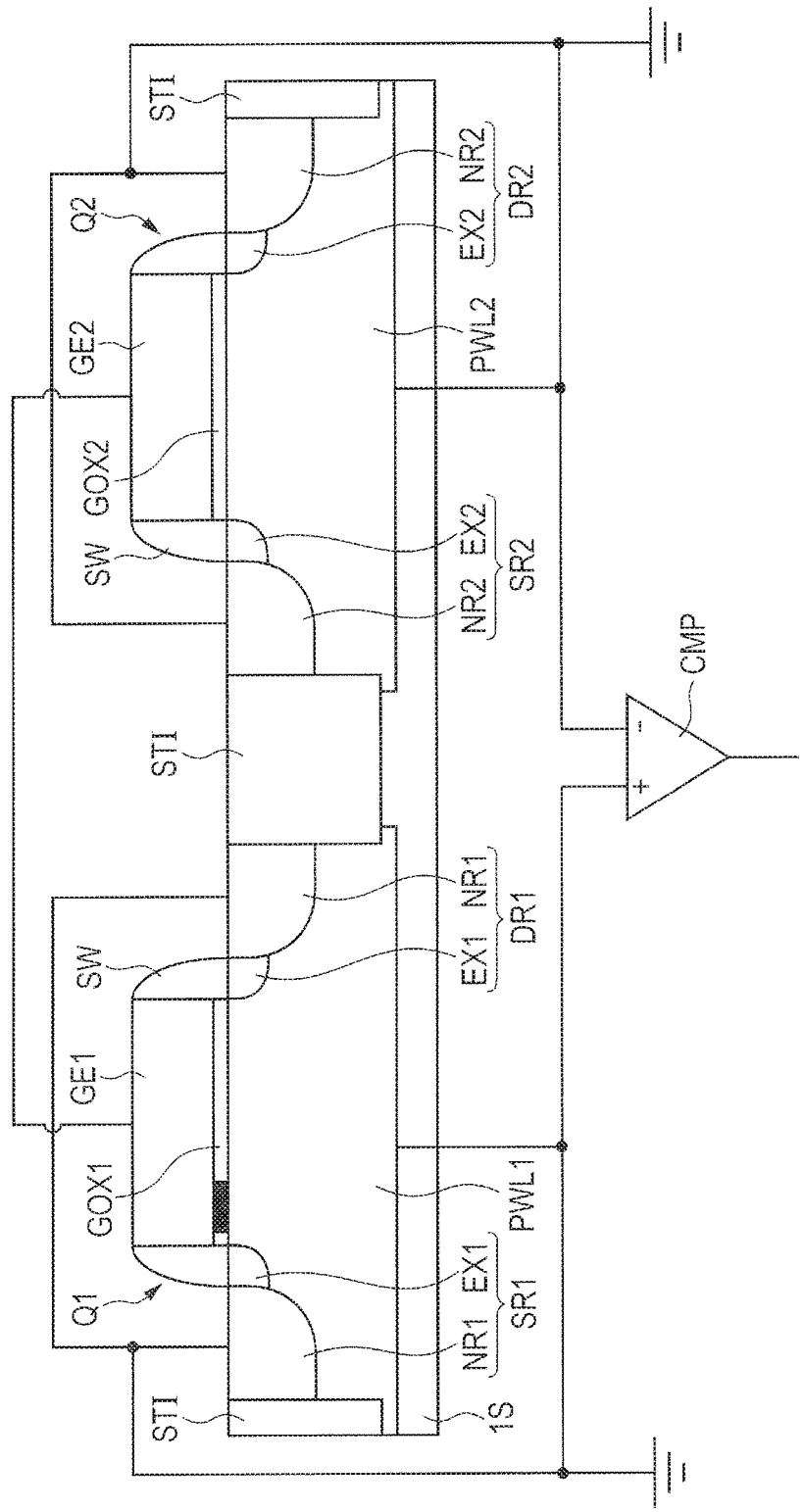
FIG. 2 is a schematic diagram illustrating a cross sectional configuration of the semiconductor device in the embodiment 1.

Subsequently, descriptions will now be made to a cross sectional configuration of the semiconductor device in the embodiment 1. FIG. 2 is a schematic diagram illustrating a cross sectional configuration of the semiconductor device in the embodiment 1. As illustrated in FIG. 2, the semiconductor device in this embodiment 1 has a semiconductor substrate 1S. At this time, an element isolation portion STI is formed over the surface of the semiconductor substrate 1S, a well PWL1 is formed in a first active region partitioned by the element isolation portion ST1, and a well PWL2 is formed in a second active region partitioned by the element isolation portion. The field effect transistor Q1 is formed in the first active region, and the field effect transistor Q2 is formed in the second active region. In other words, in this embodiment 1, the field effect transistor Q1 and the field effect transistor Q2 are separated by the element isolation portion ST1 formed over the semiconductor substrate 1S.

Descriptions will now be made to a configuration of the field effect transistor Q1 formed in the first active region. In FIG. 2, the field effect transistor Q1 has the source region SR1 formed in the semiconductor substrate 1S, the drain region DR1 formed in the semiconductor substrate 1S, and a channel region sandwiched between the source region SR1 and the drain region DR1. At this time, as illustrated in FIG. 2, the source region SR1 includes an extension region EX1 with a low impurity concentration and a semiconductor region NR1, which is formed outside the extension region EX1 and has a greater impurity concentration than that of the extension region EX1. Similarly, the drain region DR1 includes the extension region EX1 with a low impurity concentration and the semiconductor region NR1, which is formed outside the extension region EX1 and has a greater impurity concentration than that of the extension region EX1.

Subsequently, as illustrated in FIG. 2, over the channel region sandwiched between the source region SR1 and the drain region DR1, for example, a gate insulating film GOX1 formed of a silicon oxide film is formed. Particularly, in the field effect transistor Q1 in the embodiment 1, insulation breakdown is generated in this gate insulating film GOX1. Over the gate insulating film GOX1 with insulation breakdown, for example, the gate electrode GE1 formed of a polysilicon film is formed. Further, a sidewall spacer SW is formed on the sidewall of both sides of the gate electrode GE1. At this time, for example, the extension region EX1 is matched with the gate electrode GE1, while the semiconductor region NR1 is matched with the sidewall spacer SW.

Descriptions will now be made to a configuration of the field effect transistor Q2 formed in the second active region. In FIG. 2, the field effect transistor Q2 has the source region SR2 formed in the semiconductor substrate 1S, the drain region DR2 formed in the semiconductor substrate 1S, and the channel region sandwiched between the source region SR and the drain region DR2. At this time, as illustrated in FIG. 2, the source region SR2 includes the extension region EX2 with a low impurity concentration and a semiconductor region NR2, which is formed outside the extension region EX2 and has an impurity concentration greater than that of the extension region EX2. Similarly, the drain region DR2 includes the extension region EX2 with a low impurity concentration and the semiconductor region NR2, which is formed outside the extension region EX2 and has an impurity concentration greater than that of the extension region EX2.

As illustrated in FIG. 2, over the channel region sandwiched between the source region SR2 and the drain region DR2, for example, a gate insulating film GOX2 formed of a silicon oxide film is formed. Particularly, in the field effect transistor Q2 in this embodiment 1, insulation breakdown does not occur in this gate insulating film GOX2. Over the gate insulating film GOX2 without occurrence of insulation breakdown, for example, the gate electrode GE2 formed of a polysilicon film is formed. Further, on the sidewall of both sides of the gate electrode GE2, the sidewall spacer SW is formed. At this time, for example, the extension region EX2 is matched with the gate electrode GE2, while the semiconductor region NR2 is matched with the sidewall spacer SW.

As illustrated in FIG. 2, the gate electrode GE1 of the field effect transistor Q1 and the gate electrode GE2 of the field effect transistor Q2 are electrically coupled to each other. The source region SR1 of the field effect transistor Q1 and the drain region DR1 are electrically coupled to each other, while the source region SR2 of the field effect transistor Q2 and the drain region DR2 are electrically coupled to each other. Further, in this embodiment 1, insulation breakdown occurs in the gate insulating film GOX1 of the field effect transistor Q1, while insulation breakdown does not occur in the gate insulating film GOX2 of the field effect transistor Q2. As a result, in the semiconductor device in this embodiment 1, the resistance value of the gate insulating film GOX2 of the field effect transistor Q2 is greater than the resistance value of the gate insulating film GOX1 of the field effect transistor Q1. In other words, because the insulation breakdown has occurred in the gate insulating film GOX1 of the field effect transistor Q1, a conductive path is formed inside the gate insulating film GOX1. As a result of this, it can be said that the resistance value of the gate insulating film GOX1 of the field effect transistor Q1 is smaller than the resistance value of the gate insulating film GOX2 of the field effect transistor Q2.

As illustrated in FIG. 2, the source region SR1 of the field effect transistor Q1 and the drain region DR1 are electrically coupled to the ground, and the source region SR2 of the field effect transistor and the drain region DR2 are also electrically coupled to the ground. The semiconductor device in this embodiment 1 includes a comparator CMP. A first input unit (+) of this comparator CMP is coupled to the source region SR1 of the field effect transistor Q1 and the drain region DR1. A second input unit (−) of the comparator CMP is coupled to the source region SR2 of the field effect transistor Q2 and the drain region DR2.

<Operation of Semiconductor Device>

The semiconductor device in this embodiment 1 is configured as described above. Descriptions will now be made to an operation (hereinafter referred to as a write operation) for causing occurrence of insulation breakdown in one gate insulating film GOX1 of two of the gate insulating film GOX1 and the gate insulating film GOX2. Descriptions will now be made to a basic operation (hereinafter referred to as a read operation) for generating a "PUF", using the semiconductor device in this embodiment 1 having a configuration for causing occurrence of insulating breakdown in the gate insulating film GOX1 of the two gate insulating film GOX1 and the gate insulating film GOX2.

<<Write Operation>>

Figure 3:
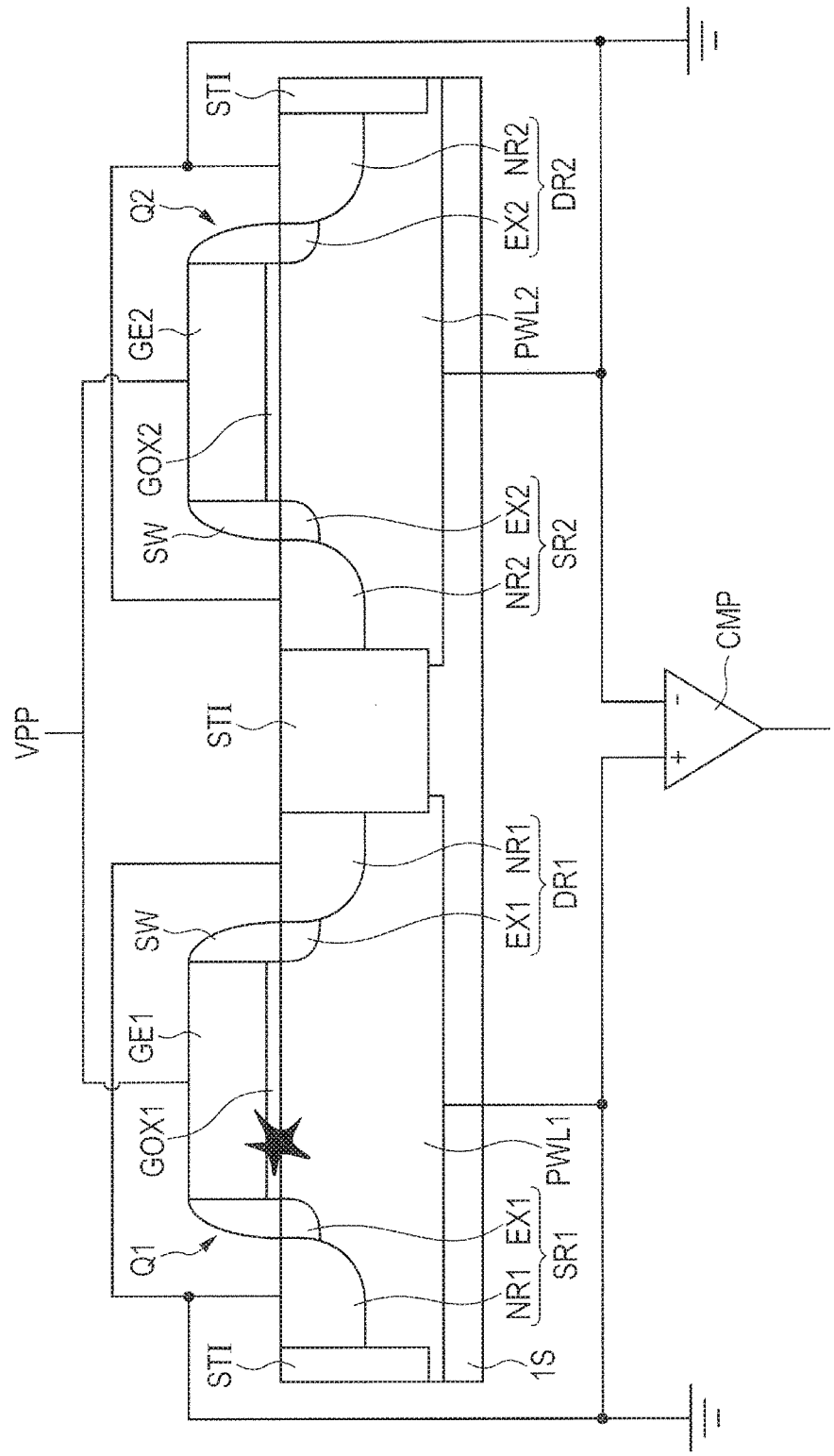
FIG. 3 is a schematic diagram for explaining a write operation in the embodiment 1.

FIG. 3 is a schematic diagram for explaining a write operation in this embodiment 1. In FIG. 3, a write voltage VPP is applied to the gate electrode GE1 and the gate electrode GE2 which are electrically coupled to each other. At this time, an withstand voltage of the gate insulating film GOX1 for insulation breakdown is lower than the gate withstand voltage for insulation breakdown, due to the manufacturing variation, in the gate insulating film GOX1 of the field effect transistor Q1 and the gate insulating film GOX2 of the field effect transistor Q2. That is, the manufacturing variation in the manufacturing process is an indispensable element. This manufacturing variation causes differences in the film thicknesses and the number of defects formed inside and between the gate insulating film GOX1 and the gate insulating film GOX2. Further, there is also a difference between the grain size of the polysilicon film included in the gate electrode GE1 formed over the gate insulating film GOX1 and the grain size of the polysilicon film included in the gate electrode GE2 formed over the gate insulating film GOX2. This results in a difference between the waviness of the interface between the gate insulating film GOX1 and the gate electrode GE1 and the waviness of the interface between the gate insulating film GOX2 and the gate electrode GE2. This implies a difference between application of the field to the gate insulating film GOX1 when a write voltage is applied to the gate electrode GE1 and application of the field to the gate insulating film GOX2 when a write voltage is applied to the gate electrode GE2. In addition, it also implies a difference between the withstand voltage of the gate insulating film GOX1 for insulation breakdown and the withstand voltage of the gate insulating film GOX2 for insulation breakdown. For example, in this embodiment 1, it is assumed that the withstand voltage of the gate insulating film GOX1 for insulation breakdown is lower than the gate withstand voltage for insulation breakdown. As a result, for example, as illustrated in FIG. 3, if the same write voltage is applied to the gate electrode GE1 and the gate electrode GE2 which are electrically coupled to each other, insulation breakdown occurs in the gate insulating film GOX1 with a low withstand voltage for insulation breakdown, while no insulation breakdown occurs in the gate insulating film GOX2 with a high withstand voltage for insulation breakdown. Accordingly, by the write operation in this embodiment 1, it is possible to cause occurrence of insulation breakdown in the gate insulating film GOX1 of the two gate insulating film GOX1 and the gate insulating film GOX2.

<<Read Operation>>

Figure 4:
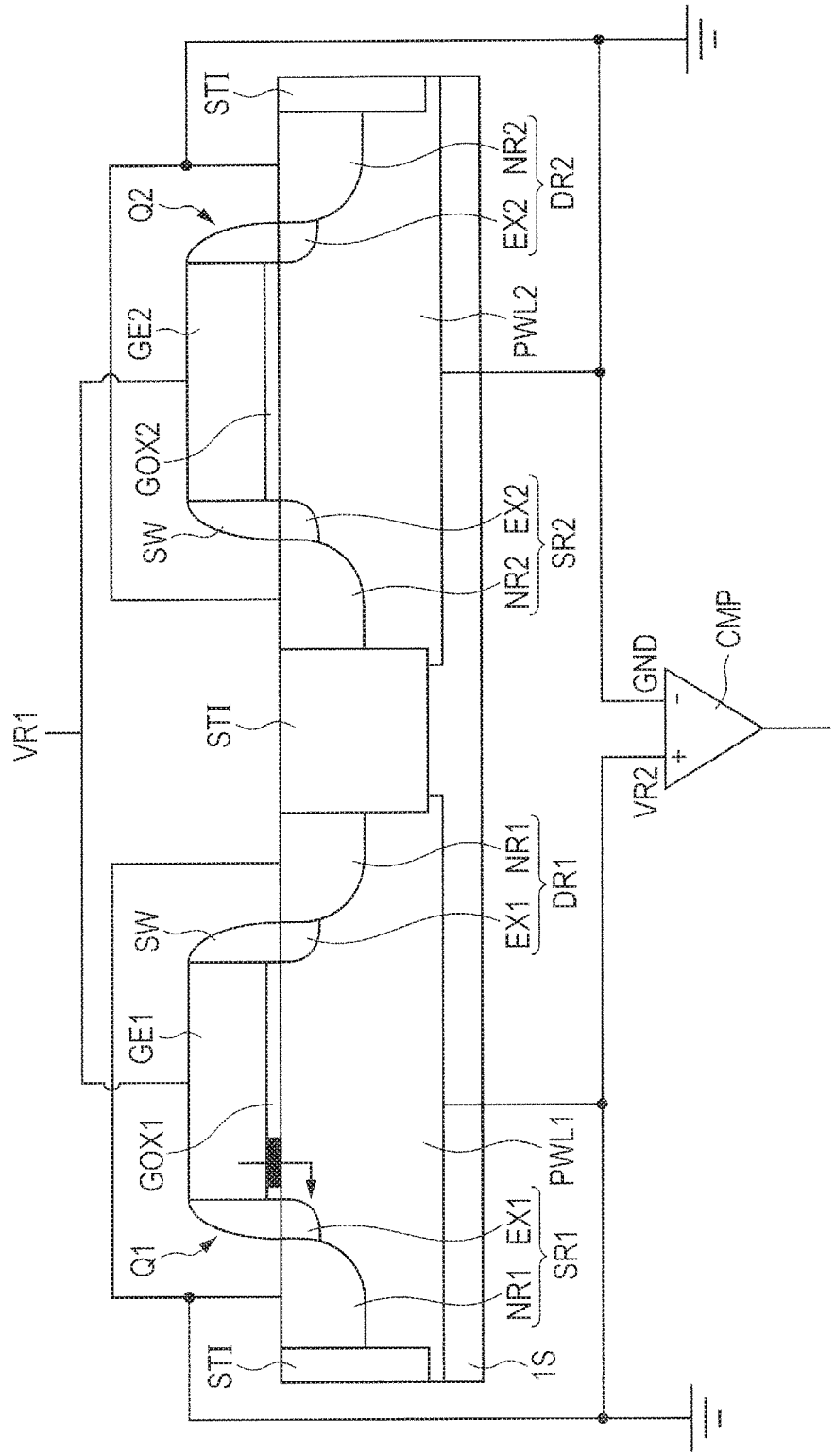
FIG. 4 is a schematic diagram for explaining a read operation in the embodiment 1.

Descriptions will now be made to a read operation in this embodiment 1. FIG. 4 is a schematic diagram for explaining the read operation in this embodiment 1. In FIG. 4, a read voltage VR1 lower than a write voltage VPP is applied to the gate electrode GE1 and the gate electrode GE2 which are electrically coupled to each other.

At this time, in the field effect transistor Q1, because insulation breakdown occurs in the gate insulating film GOX1, a current flows through a path sequentially from the gate electrode GE1→the gate insulating film GOX1 with insulation breakdown→the source region SR1→and the first input unit (+) of the comparator CMP. As a result, in consideration of a voltage drop in this current path, a voltage VR2 smaller than the read voltage VR1 is input to the first input unit (+) of the comparator CMP.

On the other hand, in the field effect transistor Q2, because insulation breakdown does not occur in the gate insulating film GOX2, no current path is formed along from the gate electrode GE2 to the second input unit (−) of the comparator CMP. As a result, a ground potential GND (0 V) is input to the second input unit (−) of the comparator CMP which is electrically coupled to the source region SR2 of the field effect transistor Q2 and the drain region DR2.

Accordingly, in the read operation in this embodiment 1, a read voltage is applied to the gate electrode GE1 and the gate electrode GE2 which are electrically coupled to each other, thus causing a current to flow from the gate electrode GE1 to the source region SR1 and the drain region DR1 through the gate insulating film GOX1 in which insulation breakdown has occurred. As a result, a potential (a voltage) input to the first input unit (+) of the comparator CMP is greater than a potential (a voltage) input to the second input unit (−) of the comparator CMP. Thus, for example, "1" is output from the output unit of the comparator CMP. When insulation breakdown occurs in the gate insulating film GOX2 of the field effect transistor Q2, instead of the gate insulating film GOX1 of the field effect transistor Q1, the potential (the voltage) input to the first input unit (+) of the comparator CMP is smaller than the potential (the voltage) input to the second input unit (−) of the comparator CMP, on the analogy of the above-described read operation. Therefore, "0" is output from the output unit of the comparator CMP.

According to this embodiment 1, it is possible to obtain an information array reflecting the manufacturing variation, based on "0/1" output from the comparator CMP, and it is possible to generate a "PUF" using this information array. In fact, the semiconductor device in this embodiment 1 is configured to generate peculiar information for specifying the semiconductor device, based on an output result output from the output unit of the comparator CMP.

<Characteristic of Embodiment 1>

Descriptions will now be made to a characteristic point of this embodiment 1. According to the first characteristic point in this embodiment 1, insulation breakdown is caused to occur in one gate insulating film of the gate insulating films with the manufacturing variation as a result of the manufacturing variation, thereby enhancing a resistance difference of the gate insulating films, as compared to the case where insulation breakdown is not caused to occur. According to the first characteristic point of this embodiment, it is possible to improve reproducibility of a "PUF", by generating the "PUF", using the resistance difference of the gate insulating films.

For example, because the manufacturing variations differ between the individual semiconductor devices, it is possible to secure the uniqueness of the "PUF" by generating the "PUF", using the manufacturing variations. However, in many cases, there is a very small difference between the manufacturing variations. Thus, when to generate the "PUF" using the manufacturing variation as is, this "PUF" is subject to the effect of the change with time or the surrounding environment. From a viewpoint of ensuring the uniqueness of the "PUF", the use of the manufacturing variation is emphasized. As a result of a very small difference in the manufacturing variations, it may undesirably lower the reproducibility of the "PUF" generated based on the manufacturing variation, due to the effect of the change with time or surrounding environment. That is, when the manufacturing variation is used, it is necessary to improve the reproducibility of the "PUF". In this embodiment 1, insulation breakdown is caused to occur as a result of the manufacturing variation in a par of the gate insulating films, with occurrence of a variation in the withstand voltages for insulation breakdown due to the manufacturing variation of the gate insulating films. By so doing, the resistance difference of the gate insulating films is more enhanced than a case where insulation breakdown is not caused to occur. That is, according to the first characteristic point in this embodiment 1, the very small manufacturing variation of the gate insulating films causes the resistance difference of the gate insulating films, based on a rough difference whether insulation breakdown has occurred. As a result, it is possible to improve the reproducibility of the "PUF" generated using the resistance difference of the gate insulating films. This is because there is no variation for inverting the resistance differences resulting from whether insulating breakdown has occurred, even if the resistance difference of the gate insulating films varies, by the effect of the change with time or the surrounding environment. That is, according to the first characteristic point of this embodiment 1, it is possible to prevent inversion of the resistance differences by providing the difference far beyond the variation by the effect of the change with time or the surrounding environment to the resistance value of the gate insulating films. The prevention of the inversion of the resistance differences of the gate insulating films implies suppression of bit inversion of the "PUF" generated based on the resistance difference of the gate insulating film, and also implies improvement of the reproducibility of the "PUF".

As described, above, according to the embodiment 1, it is possible to secure the uniqueness of the "PUF", which is peculiar to the semiconductor devices, with using the manufacturing variation. In addition, it is possible to secure the reproducibility thereof, by adopting the first characteristic point of the above-described embodiment 1. That is, it is understood that this embodiment is excellent in providing the "PUF" including both of the uniqueness and the reproducibility.

According to the first characteristic point of the embodiment 1, it is possible to improve the reproducibility of the "PUF". It is, therefore, not necessary to provide an error correction encoding circuit. For example, when the reproducibility of the "PUF" is deteriorated by the bit inversion, the "PUF" may possibly be recovered by forming the error correction encoding circuit in the semiconductor device. However, the size of the semiconductor device is enlarged, if the error correction encoding circuit is formed therein. For this point, in the embodiment 1, the reproducibility of the "PUF" is improved by adopting the above-described first characteristic point. According to the semiconductor device of this embodiment 1, it is less likely to need to provide the error correction encoding circuit. This implies possibility of deletion or reduction of the error correction encoding circuit in the semiconductor device according to this embodiment 1, thus enabling to downsize the semiconductor device.

Subsequently, according to a second characteristic point of the embodiment 1, as illustrated in FIG. 3, the gate electrode GE1 of the field effect transistor Q1 and the electrode GE2 of the field effect transistor Q2 are electrically coupled to each other. In this case, as illustrated in FIG. 3, the same write voltage can be applied to the gate electrode GE1 and the gate electrode GE2.

For example, assuming that the withstand voltage of the gate insulating film GOX1 of the field effect transistor Q1 for insulation breakdown is lower than the withstand voltage of the field effect transistor Q2 for insulation breakdown, insulation breakdown first occurs in the gate insulating film GOX1, when the same write voltage is applied to the gate electrode GE1 and the gate electrode GE2. At this time, if the insulation breakdown occurs in the gate insulating film GOX1, a current flows from the gate electrode GE1 to the source region SR1 (the drain region DR1) through the gate insulating film GOX1 with occurrence of insulation breakdown. This results in lowering the voltage value of the write voltage applied to the gate electrode GE1 and the gate electrode GE2, by a voltage drop due to current flow. Then, no insulation breakdown occurs in the gate insulating film GOX2 with a greater withstand voltage than that of the gate insulating film GOX1. That is, according to the second characteristic point of this embodiment 1, if insulation breakdown occurs in the gate insulating film GOX1 with a low withstand voltage for insulation breakdown, the write voltage is necessarily lowered. As a result, it is possible not to certainly cause insulation breakdown in the other gate insulating film GOX2 with the great withstand voltage for insulation breakdown. That is, according to the second characteristic point of this embodiment 1 that the gate electrode GE1 and the gate electrode GE2 are electrically coupled to each other, it is possible to effectively prevent that insulation breakdown occurs both in the gate insulating film GOX1 and the gate insulating film GOX2. In this embodiment, the "PUF" having high reproducibility is generated, using a rough difference whether insulation breakdown has occurred. Thus, it is preferred to avoid a case in which insulation breakdown occurs both in the gate insulating film GOX1 and the gate insulating film GOX2. For this point, according to the second characteristic point of the embodiment 1, it is possible to prevent insulation breakdown both in the gate insulating film GOX1 and the gate insulating film GOX2.

According to a third characteristic point of this embodiment 1, for example, in FIG. 4, the field effect transistor Q1 and the field effect transistor Q2 are configured respectively with depression transistors, instead of enhancement transistors. In this case, for example, a read current denoted by an arrow of FIG. 4 can be increased. For example, in FIG. 4, the field effect transistor Q1 is focused. When the field effect transistor Q1 is configured with an enhancement transistor, if a read voltage is applied to the gate electrode GE1, there is formed an inversion layer in a channel region formed right below the gate insulating film GOX1. A read current flows through a path sequentially from the gate electrode GE1→the gate insulating film GOX1 with insulation breakdown→the inversion layer→the extension region EX1→the semiconductor region NR1→and the first input unit (+) of the comparator CMP. In this case, if the field effect transistor Q1 is configured with a depression transistor, an inversion layer is formed, even when the read voltage is not applied to the gate electrode GE1. Thus, if the read voltage is applied, it is possible to increase the read current flowing through the inversion layer. Therefore, in the comparator CMP, when a comparison result is output based on whether the read current flows, it is possible to improve the accuracy of the comparison determination by the comparator CMP, if the read current increases. For example, though insulation breakdown has occurred weakly in the gate insulating film GOX1, a small amount of the read current may flow. Even in this case, if the field effect transistor Q1 is configured with a depression transistor, it is possible to more easily secure the read current than the case in which the field effect transistor Q1 is configured with an enhancement transistor.

According to the basic idea of this embodiment, the field effect transistor Q1 and the field effect transistor Q2 can be configured with enhancement transistors. Particularly, from a viewpoint of securing the read current, according to the third characteristic point of this embodiment 1, it is possible to assume that the field effect transistor Q1 and the field effect transistor Q2 are desirably configured with depression transistors.

For example, as illustrated in FIG. 4, from a viewpoint of increasing the read current, it is preferred to provide the extension region EX1. However, the basic idea in this embodiment 1 is not limited to this configuration, and the extension region EX1 is not necessarily provided. This is because a read current flows between the channel region (the inversion layer) and the semiconductor region NR1, due to diffusion of the conductive impurity introduced into the semiconductor region NR1 matched with the sidewall spacer SW, even if no extension region EX1 is provided. Note that it is possible to increase the read current by providing the extension region EX1, as compared to the case in which the extension region EX1 is not provided.

As described above, from the viewpoint of increasing the read current, it is preferred to provide an embodying configuration for forming the extension region EX1, in addition that the field effect transistor Q1 and the field effect transistor Q2 are configured with depression transistors.

<Cell Array Configuration Using Anti-Fuse>

Subsequently, in this embodiment 1, the configuration of the semiconductor device illustrated in FIG. 1 and FIG. 2 is adopted as an anti-fuse cell. Descriptions will now be made to an example of embodying the basic idea in this embodiment 1, by configuring the array with a plurality of the above cells.

Figure 5:
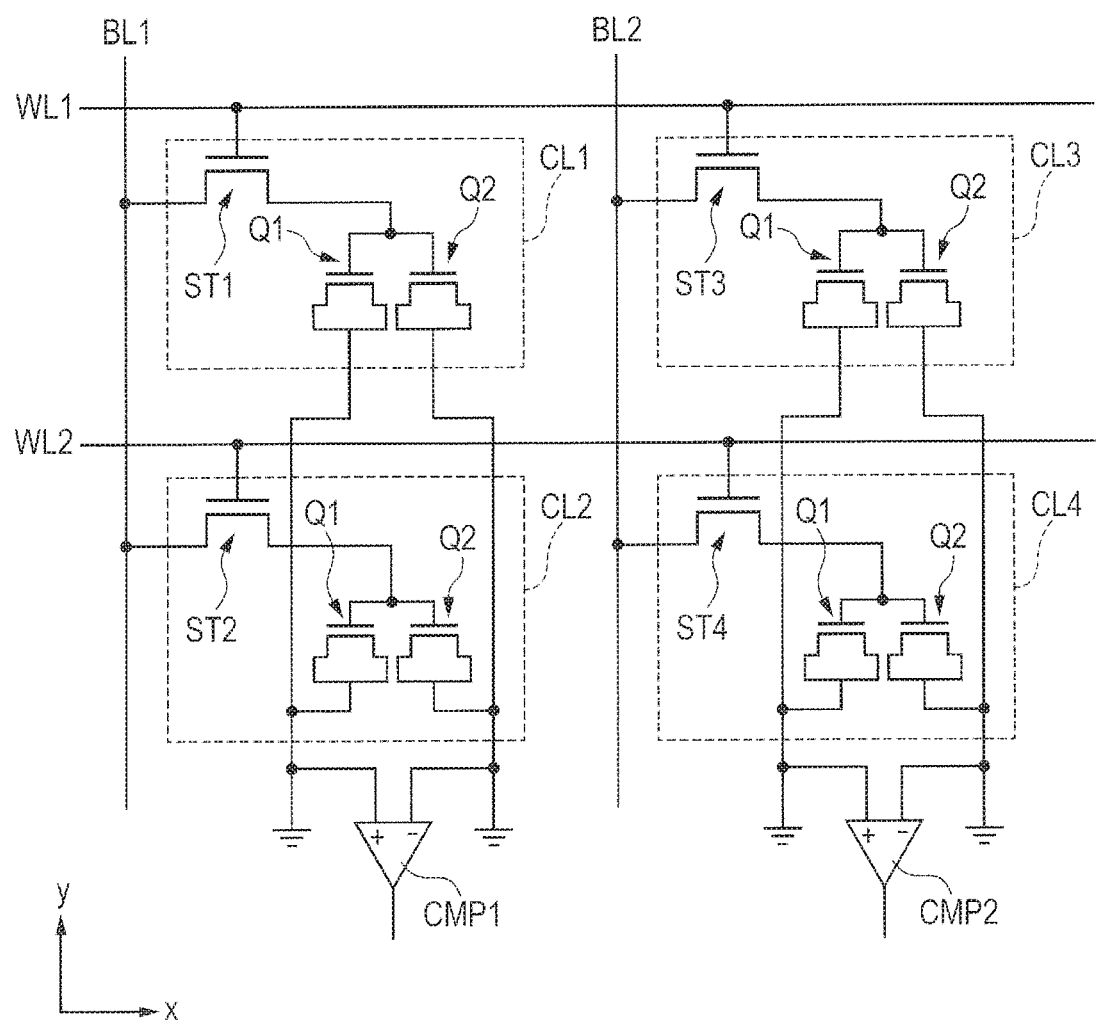
FIG. 5 is a schematic diagram illustrating a partial configuration of a cell array in the embodiment 1.

FIG. 5 is a schematic diagram illustrating a partial configuration of the cell array in this embodiment 1. As illustrated in FIG. 5, the cell array in this embodiment 1 has a word line WL1 extending in an x-direction, a word line WL2 arranged apart from the word line WL1 in a y-direction intersecting the x-direction and extending in the x-direction, a bit line BL1 extending in the y-direction, and a bit line BL2 arranged apart from the bit line BL1 in the x-direction and extending in the y-direction.

The cell array in this embodiment 1 has a cell CL1 arranged in an intersection region of the word line WL1 and the bit line BL1, a cell CL2 arranged in an intersection region of the word line WL2 and the bit line BL1, a cell CL3 arranged in an intersection region of the word line WL1 and the bit line BL2, and a cell CL4 arranged in an intersection region of the word line WL2 and the bit line BL2.

At this time, for example, anti-fuse cells are used for the cells CL1 to CL4. In this case, the "anti-fuse" represents a constituent element which is inverted from a "fuse" for executing the function by disconnection. For example, the "anti-fuse" is used at the time of replacing a fault circuit formed in the semiconductor device by a relief circuit. In this embodiment 1, the anti-fuse cell array for use in the semiconductor device is used for generating the "PUF" in this embodiment 1.

The cell array in this embodiment 1 is electrically coupled to the cell CL1 and the cell CL2. The cell array is electrically coupled to a comparator CMP1 having a first input unit, a second input unit, and an output unit, the cell CL3, and the cell CL4. The cell array is also electrically coupled to a comparator CMP2 having a first input unit, a second input unit, and an output unit.

As illustrated in FIG. 5, the cell CL1 is configured with a selection transistor ST1, the field effect transistor Q1, and the field effect transistor Q2. The cell CL2 is configured with a selection transistor ST2, the field effect transistor Q1, and the field effect transistor Q2. Similarly, the cell CL3 is configured with a selection transistor ST3, the field effect transistor Q1, and the field effect transistor Q2. The cell CL4 is configured with a selection transistor ST4, the field effect transistor Q1, and the field effect transistor Q2.

The source region and the drain region of the field effect transistor Q1 included partially in each of the cell CL1 and the cell CL2 are electrically coupled to the first input unit (+) of the comparator CMP1. The source region and the drain region of the field effect transistor Q2 included partially in each of the cell CL1 and the cell CL2 are electrically coupled to the second input unit (−) of the comparator CMP1. In this case, the comparator CMP1 is used for the read operation of the cell CL1 and for the read operation of the cell CL2.

Similarly, the source region and the drain region of the field effect transistor Q1 included partially in each of the cell CL3 and the cell CL4 are electrically coupled to the first input unit (+) of the comparator CMP2. The source region and the drain region of the field effect transistor Q2 included partially in each of the cell CL3 and the cell CL4 are electrically coupled to the second input unit (−) of the comparator CMP2. In this case, the comparator CMP2 is used for the read operation of the cell CL3 and for the read operation of the cell CL4.

<Operation of Cell Array>

Figure 6:
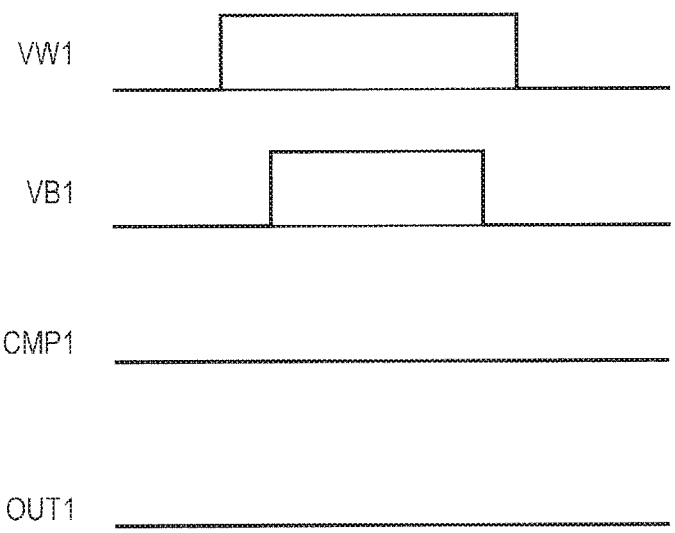
FIG. 6 is a timing chart for performing a write operation for the cell.
Figure 7:
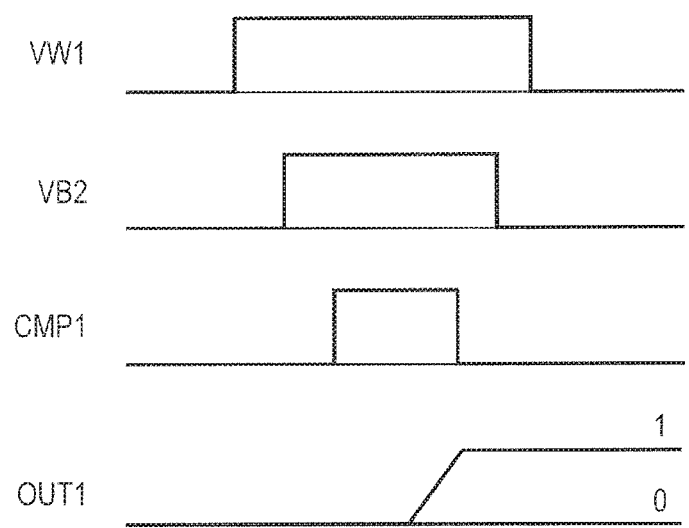
FIG. 7 is a timing chart for performing a read operation for the cell.

The cell array in this embodiment 1 is configured as described above. Descriptions will now be made to an operation of the cell array, by reference to FIG. 5 to FIG. 7. FIG. 6 is a timing chart for executing a write operation for the cell CL1 illustrated in FIG. 5. FIG. 7 is a timing chart for executing a read operation for the cell CL1 illustrated in FIG. 5.

Descriptions will now be made to the write operation for the cell CL1, using FIG. 5 and FIG. 6. As illustrated in FIG. 5 and FIG. 6, a word voltage VW1 equal to or greater than a threshold voltage is applied to the word line WL1. Then, the selection transistor ST1 of the cell CL1 and the selection transistor ST3 of the cell CL3 are turned on. 0 V lower than the threshold voltage is applied to the word line WL2. Then, the selection transistor ST2 of the cell CL2 and the selection transistor ST4 of the cell CL4 which are electrically coupled to the word line WL2 remain off.

In the state, a bit potential VB1 (a write voltage) is applied to the bit line BL1, while 0 V is applied to the bit line BL2. As a result, in the cell CL1, a write voltage is applied from the bit line BL1 to the gate electrode of the field effect transistor Q1 and the gate electrode of the field effect transistor Q2, through the turned-on selection transistor ST1. Due to the manufacturing variation, insulation breakdown occurs in the gate insulating film having a low withstand voltage for insulation breakdown, of the gate insulating film of the field effect transistor Q1 and the gate insulating film of the field effect transistor Q2. As a result of this, the write operation in the cell CL1 ends. In the write operation, because the comparator CMP1 is not used, the output from the comparator CMP1 remains 0 V.

Subsequently, descriptions will now be made to a read operation for the cell CL1, using FIG. 5 and FIG. 7. As illustrated in FIG. 5 and FIG. 7, a word potential VW1 equal to or greater than the threshold voltage is applied to the word line WL1. Then, the selection transistor ST1 of the cell CL1 and the selection transistor ST3 of the cell CL3 are turned on. 0 V lower than the threshold voltage is applied to the word line WL2. Then, the selection transistor ST2 of the cell CL2 and the selection transistor ST4 of the cell CL4 which are electrically coupled to the word line WL2 remain off.

In this state, a bit potential VB2 (a read voltage) is applied to the bit line BL1, while 0 V is applied to the bit line BL2. Then, in the cell CL1, a read voltage is applied from the bit line BL1 to the gate electrode of the field effect transistor Q1 and the gate electrode of the field effect transistor Q2, through the turned-on selection transistor ST1.

At this time, for example, because insulation breakdown has occurred in the gate insulating film of the field effect transistor Q1 of the cell CL1, a read current flows through a path sequentially from the gate electrode of the field effect transistor→the gate insulating film with insulation breakdown→the source region (the drain region)→and the first input unit (+) of the comparator CMP. Because insulation breakdown has not occurred in the gate insulating film of the field effect transistor Q2 of the cell CL1, the read current does not flow from the gate electrode of the field effect transistor Q1 to the second input unit (−) of the comparator CMP. As a result, for example, "1" is output from the comparator CMP1. On the contrary, for example, when insulation breakdown has occurred in the gate insulating film of the field effect transistor Q2 of the cell CL1, "0" is output from the comparator CMP1, on the analogy of the above-described operation. As a result, based on an output result from the comparator CMP1, a "PUF" can be generated. In fact, in the case of the cell array configuration of FIG. 5, the "PUF" is generated, based on the output result from each of the cell CL1 to the cell CL4.

<Characteristic Peculiar to Cell Array>

Descriptions will now be made to a characteristic point peculiar to the cell array in this embodiment 1. According to a fourth characteristic point of this embodiment 1, for example, as illustrated in FIG. 5, a cell array is configured to include the cell CL1 to the cell CL4 each of which is formed from the selection transistor, the field effect transistor Q1, and the field effect transistor Q2. As a result, it is easily possible to generate the "PUF" peculiar to the semiconductor device.

For example, focusing on the cell CL1 of the cell array, it is possible to generate "0/1" based on the manufacturing variation, by this cell CL1. That is, it is possible to represent 1-bit information by the cell CL1. Each of the cell CL2 to the cell CL4 has the same configuration as that of the cell CL1. In each of the cell CL2 to the cell CL4, it is possible to represent 1-bit information based on the manufacturing variation. Thus, in the cell array including the cell CL1 to the cell CL4, it is possible to represent a 4-bit information array based on a combination of the cell CL1 to the cell CL4. That is, for example, in the individual semiconductor devices, when only the cell CL1 is used, the "PUF" generated by the individual semiconductor devices is configured with 1-bit information. However, in this case, the same "PUF" may very likely to be generated for the individual semiconductor devices, and it is difficult to generate the "PUFs" peculiar to the individual semiconductor devices.

For this point, in this embodiment 1, for example, the "PUF" is generated using the cell array including the cell CL1 to the cell CL4. In this case, because 1-bit information is formed by each of the cells CL1 to the cell CL4, it is possible to generate the "PUF" formed of a 4-bit information array, by combining the cell CL1 to the cell CL4 included in the cell array. Thus, in the individual semiconductor devices, when the combination of the cell CL1 to the cell CL4 is used, the "PUF" generated by the individual semiconductor devices is configured with 4-bit information array. As compared with the "PUF" generated only by the cell CL1, the "PUFs" generated by the cell array with the combination of the cell CL1 to the cell CL4 are very likely to be "PUFs" which are different between the semiconductor devices, and thus it is easily possible to generate the "PUFs" peculiar to the individual semiconductor devices. For easy descriptions, the descriptions have been made to the cell array formed of the cells CL1 to CL4 by way of example. By increasing the number of cells included in the cell array, it is easy to generate the "PUFs" peculiar to the individual semiconductor devices as much as possible. That is, as the number of cells included in the cell array increases, it is possible to increase the uniqueness of the "PUF" generated by each of the semiconductor devices, as a result of increasing the number of bits of the information array included in the "PUF". In this manner, according to the fourth characteristic point of this embodiment 1, to generate the "PUF", as a result that the cell array is configured, it is possible to easily realize the "PUF" peculiar to each of the individual semiconductor devices, in other words, the "PUF" with high uniqueness.

Subsequently, according to a fifth characteristic point of this embodiment 1, each of a plurality of cells included in the cell array is configured using the anti-fuse. For example, the "anti-fuse" is a constituent element which is inverted from a "fuse" for executing the function by disconnection, and is a constituent element for executing the function by conduction. For example, the "anti-fuse" is used as a switch at the time of replacing a fault circuit formed in the semiconductor device by a relief circuit. In this embodiment 1, the cell array of the anti-fuse formed in the semiconductor device is used for generating the "PUF" in this embodiment 1. This is because generation of the "PUF" in this embodiment 1 is realized by the configuration for enhancing the resistance difference of the gate insulating films by causing occurrence of insulation breakdown due to the manufacturing variation in one gate insulating film of the gate insulating films having the manufacturing variation, as compared with the case where insulation breakdown does not occur. That is, the generation of the "PUF" in this embodiment 1 uses the insulation breakdown of the gate insulating film. Insulation breakdown implies formation of a conduction path in the insulating film. The "anti-fuse" for executing the function by conduction and the "insulation breakdown" are highly relevant to each other. That is, because the insulation breakdown for use in generating the "PUF" in this embodiment 1 is a type of conduction phenomenon, it is easy to realize it with the "anti-fuse" for executing the function by conduction. In this embodiment 1, the cell array for generating the "PUF" is formed by using the "anti-fuse". The "anti-fuse" exists as an existing constituent element in the semiconductor device. Thus, the existing "anti-fuse" is applied to the cell array for generating the "PUF", thereby reducing the generation cost of the "PUF". That is, according to the fifth characteristic point of this embodiment 1, it is possible to generate the "PUF" having excellent uniqueness and reproducibility, while suppressing an increase in the generation cost of the "PUF".

According to a sixth characteristic point of this embodiment 1, for example, as illustrated in FIG. 5, the comparator CMP1 is used commonly both in the cell CL1 and the cell CL2. Similarly, according to the sixth characteristic point of this embodiment 1, for example, as illustrated in FIG. 5, the comparator CMP2 is used commonly both in the cell CL3 and the cell CL4. In other words, according to the sixth characteristic point of this embodiment 1, the comparator is commonly used in the cells sharing the bit line. As a result, according to the sixth characteristic point of this embodiment 1, there is no need to provide the comparator for each of the cells included in the cell array, thus enabling to downsize the semiconductor device.

Embodiment 2

<Configuration of Semiconductor Device>
<<Plane Configuration of Semiconductor Device>>

Figure 8:
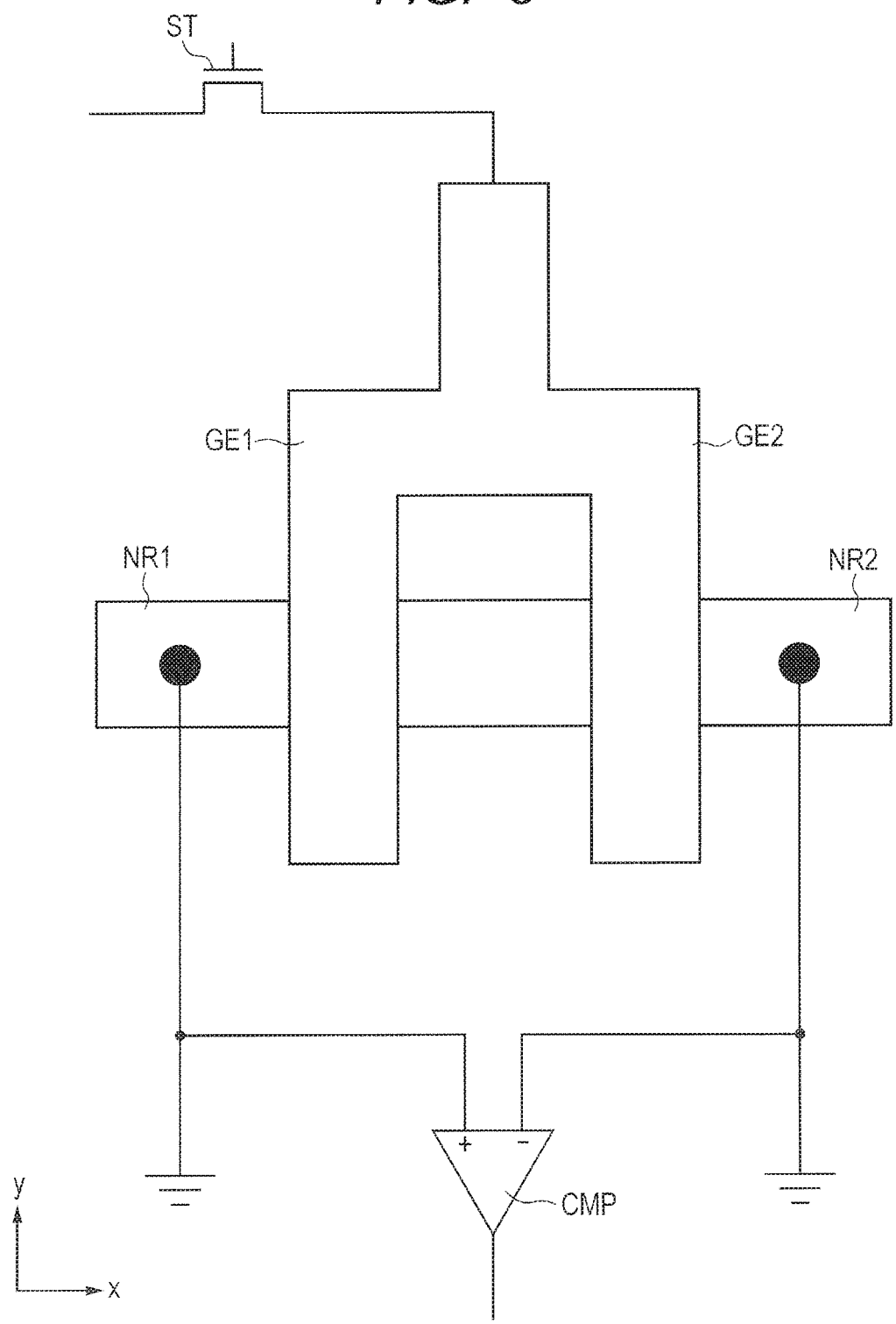
FIG. 8 is a schematic diagram illustrating a plane configuration of a semiconductor device in an embodiment 2.

Descriptions will now be made to a semiconductor device in this embodiment 2. FIG. 8 is a schematic diagram illustrating a plane configuration of the semiconductor device in this embodiment 2. As illustrated in FIG. 8, the semiconductor device has a gate electrode GE1 extending in a y-direction and a gate electrode GE2 extending in the y-direction in parallel to this gate electrode GE1. At this time, the gate electrode GE1 and the gate electrode GE2 are electrically coupled to each other, and are electrically coupled to the selection transistor ST. The semiconductor device according to this embodiment 2 has, in plan view, a semiconductor region NR1 formed outside the gate electrode GE1 and a semiconductor region NR2 formed outside the gate electrode GE2. The semiconductor device in this embodiment 2 has a comparator CMP. A first input unit (+) of the comparator CMP, the semiconductor region NR1, and the ground are electrically coupled. In the semiconductor device in this embodiment 2, the second input unit (−) of the CMP, the semiconductor region NR2, and the ground are electrically coupled to each other.

<<Cross Sectional Configuration of Semiconductor Device>>

Figure 9:
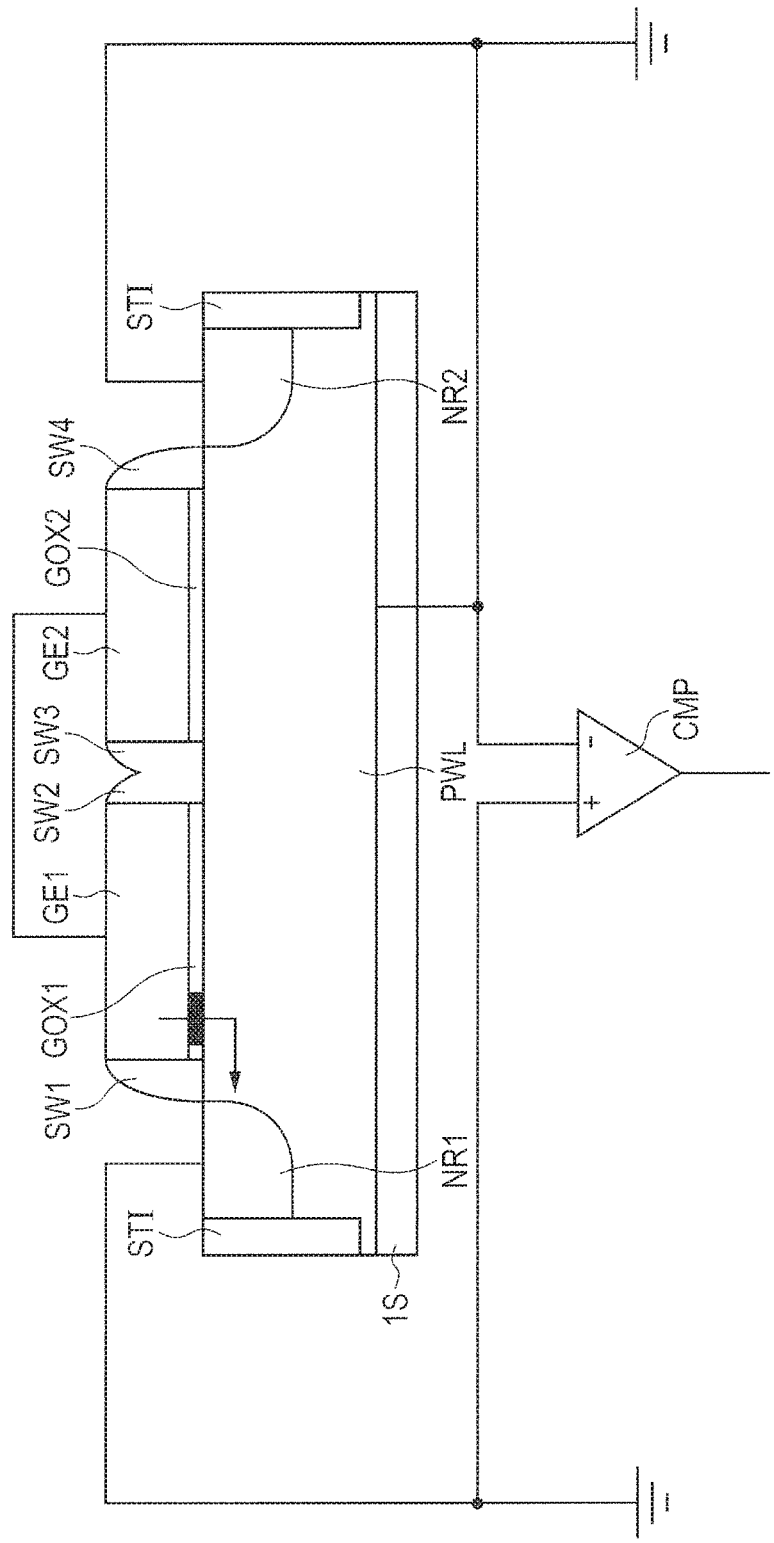
FIG. 9 is a schematic diagram illustrating a cross sectional configuration of the semiconductor device in the embodiment 2.

FIG. 9 is a schematic diagram illustrating a cross sectional configuration of the semiconductor device in this embodiment 2. As illustrated in FIG. 9, the semiconductor device in this embodiment 2 has a semiconductor substrate 1S. An element isolation portion STI is formed over the surface of this semiconductor substrate 1S. In the semiconductor device in this embodiment 2, a well PWL is formed in an active region partitioned by the element isolation portion STI. The semiconductor device has the semiconductor region NR1 and the semiconductor region NR2 which are arranged apart from each other in a manner that they are included in this well PWL. Further, as illustrated in FIG. 9, the semiconductor device in this embodiment 2 has a gate insulating film GOX1 and a gate insulating GOX2 which are arranged in parallel and apart from each other, over the surface of the semiconductor substrate 1S sandwiched between the semiconductor region NR1 and the semiconductor region NR2. In this case, insulation breakdown occurs in the gate insulating film GOX1, while no insulation breakdown occurs in the gate insulating film GOX2. As a result, the resistance value of the gate insulating film GOX1 is smaller than the resistance value of the gate insulating film GOX2.

The gate electrode GE1 is formed on the gate insulating film GOX1, while the gate electrode GE2 is formed on the gate insulating film GOX2. The gate electrode GE1 and the gate electrode GE2 are electrically coupled to each other. In FIG. 9, a sidewall spacer SW1 is formed on the left sidewall of the gate electrode GE1, while a sidewall spacer SW2 is formed on the right sidewall of the gate electrode GE1. Similarly, in FIG. 9, a sidewall spacer SW3 is formed on the left sidewall of the gate electrode GE2, while a sidewall spacer SW4 is formed on the right sidewall of the gate electrode GE2. At this time, the sidewall spacer SW2 and the sidewall spacer SW3 are formed in contact with each other.

As illustrated in FIG. 9, the semiconductor device in this embodiment 2 has the comparator CMP. The first input unit (+) of the comparator CMP is electrically coupled to the semiconductor region NR1 and the ground. The second input unit (−) of the comparator CMP is electrically coupled to the semiconductor region NR2 and the ground.

As described above, the semiconductor device in this embodiment 2 has, as illustrated in FIG. 9, the semiconductor substrate 1S, the gate insulating film GOX1 formed on the semiconductor substrate 1S, the gate electrode GE1 formed on the gate insulating film GOX1, the sidewall spacer SW1 formed on the left sidewall of the gate electrode GE1, and the sidewall spacer SW2 formed on the right sidewall of the gate electrode GE1.

The semiconductor device in this embodiment 2 has the gate insulating film GOX2 formed on the semiconductor substrate 1S and arranged apart from the gate insulating film GOX1, the gate electrode GE2 formed on the gate insulating film GOX2, the sidewall spacer SW3 formed on the left sidewall of the gate electrode GE2, and the sidewall spacer SW4 formed on the right sidewall of the gate electrode GE2.

Further, the semiconductor device in this embodiment 2 has the semiconductor region NR1 formed inside the semiconductor substrate 1S and formed outside the sidewall spacer SW1 and the semiconductor region NR2 formed inside the semiconductor substrate 1S and formed outside the sidewall spacer SW4.

As illustrated in FIG. 9, the gate electrode GE1 and the gate electrode GE2 are electrically coupled to each other. The sidewall spacer SW2 and the sidewall spacer SW3 are coupled to each other. Insulation breakdown occurs in the gate insulating film GOX1. The resistance value of the gate insulating film GOX2 is greater than the resistance value of the gate insulating film GOX1.

<Characteristic of Embodiment 2>

Descriptions will now be made to a characteristic point of this embodiment 2. According to the characteristic point of the embodiment 2, for example, as illustrated in FIG. 9, the sidewall spacer SW2 formed on the right sidewall of the gate electrode GE1 and the sidewall spacer SW3 formed on the left sidewall of the gate electrode GE2 are coupled. According to the embodiment 2, it is possible to reduce the distance between the gate electrode GE1 and the gate electrode GE2 which are electrically coupled to each other, thereby enabling to downsize the semiconductor device according to the embodiment 2. Further, according to the characteristic point of the embodiment 2, no semiconductor region is formed in a region right below the sidewall spacer SW2 and the sidewall spacer SW3 which are coupled to each other. As a result, for example, as illustrated in FIG. 9, the current path of the read current may be limited to a path of sequentially from the gate electrode GE1→the gate insulating film GOX1 with insulation breakdown→the channel region→the semiconductor region NR1→the first input unit (+) of the comparator CMP.

In the semiconductor device according to the embodiment 2, as illustrated in FIG. 9, no extension region is provided in a region right below the sidewall spacer SW1. Even in this case, a read current may flow from the channel region to the semiconductor region NR1 along an arrow direction of FIG. 9, due to diffusion of the semiconductor region NR1 to the region right below the sidewall spacer SW1. However, from a viewpoint of increasing the read current, it is desired to provide the extension region in the region right below the sidewall spacer SW1.

<Manufacturing Method of Semiconductor Device>

The semiconductor according to the embodiment 2 is configured as described above. Descriptions will hereinafter be made to its manufacturing method, by reference to the accompanying drawings.

Figure 10:
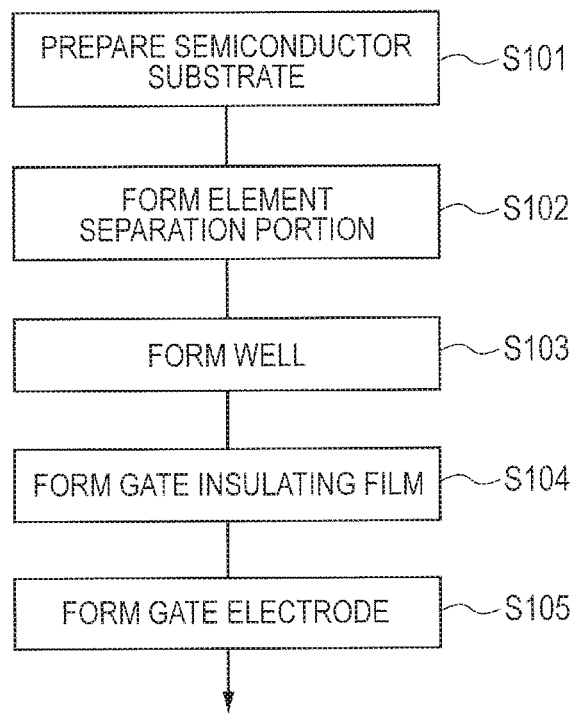
FIG. 10 is a flowchart illustrating the flow of a manufacturing process of the semiconductor device in the embodiment 2.

In FIG. 10, for example, there is prepared a semiconductor substrate which is formed of silicon single crystal (S101). After this, an element isolation portion is formed over the surface of the semiconductor substrate (S102). A well is formed in an active region of the semiconductor substrate portioned by the element isolation portion, using a photolithography technique and an ion implantation method (S103). Then, over the semiconductor substrate, the first gate insulating film and the second gate insulating film which include silicon oxide films are formed (S104). A first gate electrode is formed on the first gate insulating film, and a second gate electrode is formed on the second gate insulating film (S105).

Figure 11:
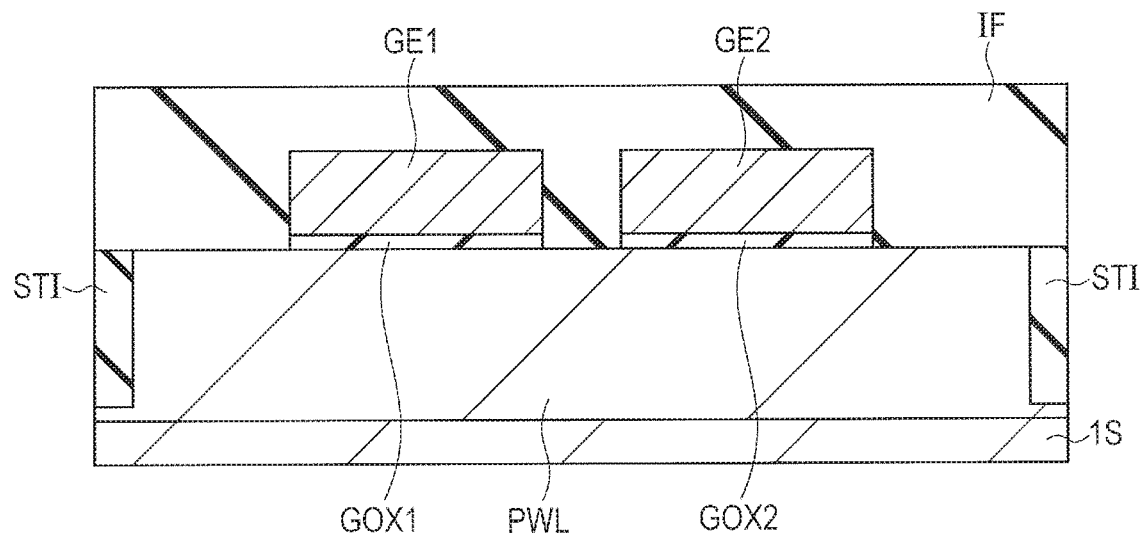
FIG. 11 is a cross sectional diagram illustrating a manufacturing process of the semiconductor device in the embodiment 2.

As illustrated in FIG. 11, an insulating film IF is formed to cover the gate electrode GE1 (the first gate electrode) formed on the semiconductor substrate 1S through the gate insulating film GOX1 (the first gate insulating film) and the gate electrode GE2 (the second gate electrode) formed on the semiconductor substrate 1S through the gate insulating film GOX2 (the second gate insulating film). At this time, the insulating film IF is formed from, for example, a silicon oxide film, and can be formed using a CVD (Chemical Vapor Deposition) technique.

Figure 12:
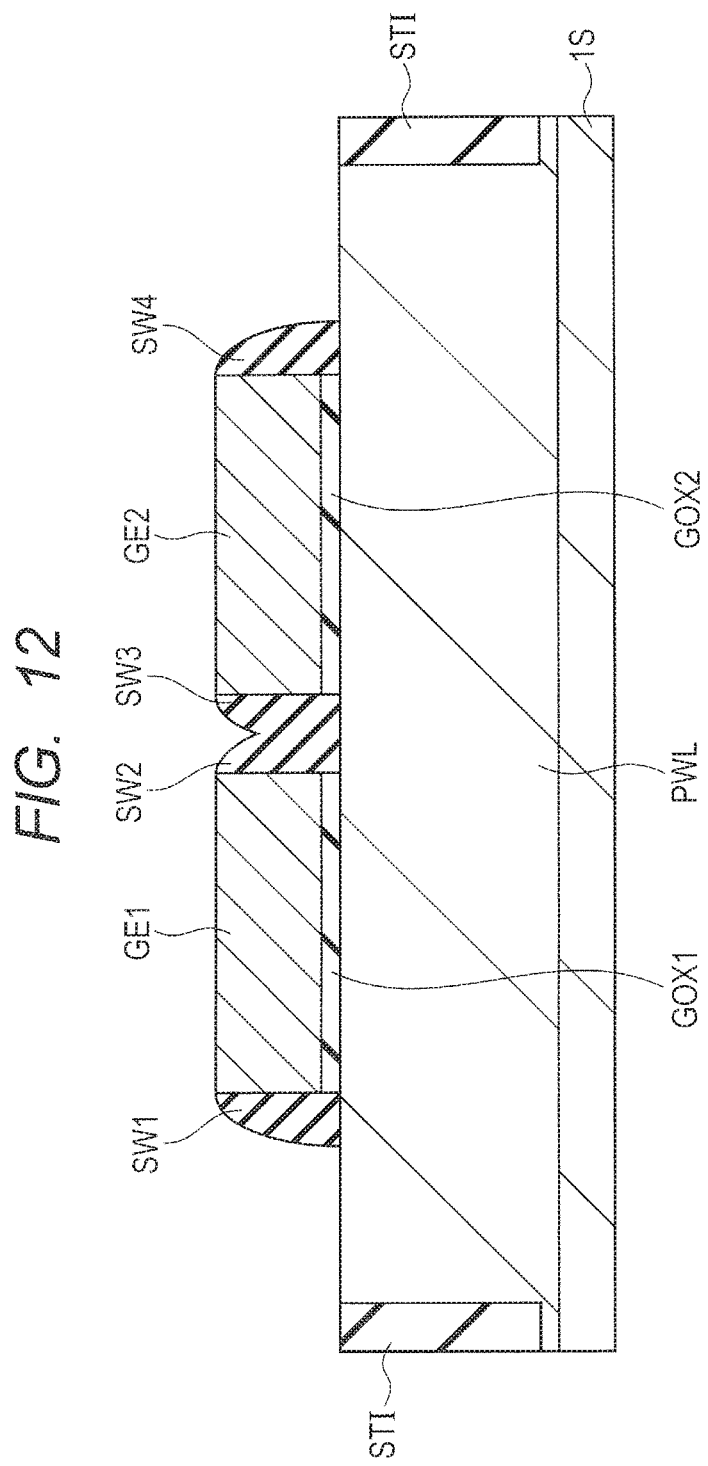
FIG. 12 is a cross sectional diagram illustrating a manufacturing process of the semiconductor device, after that of FIG. 11.

As illustrated in FIG. 12, anisotropic etching is performed for the insulating film IF, the sidewall spacer SW1 is formed on the left sidewall of the gate electrode GE1, and the sidewall spacer SW2 is formed on the right sidewall of the gate electrode GE1. At the same time, the sidewall spacer SW3 is formed on the left sidewall of the gate electrode GE2, and the sidewall spacer SW4 is formed on the right sidewall of the gate electrode GE2. At this time, the sidewall spacer SW2 formed on the right sidewall of the gate electrode GE1 and the sidewall spacer SW3 formed on the left sidewall of the gate electrode GE2 are coupled, due to a narrow space between the gate electrode GE1 and the gate electrode GE2.

Figure 13:
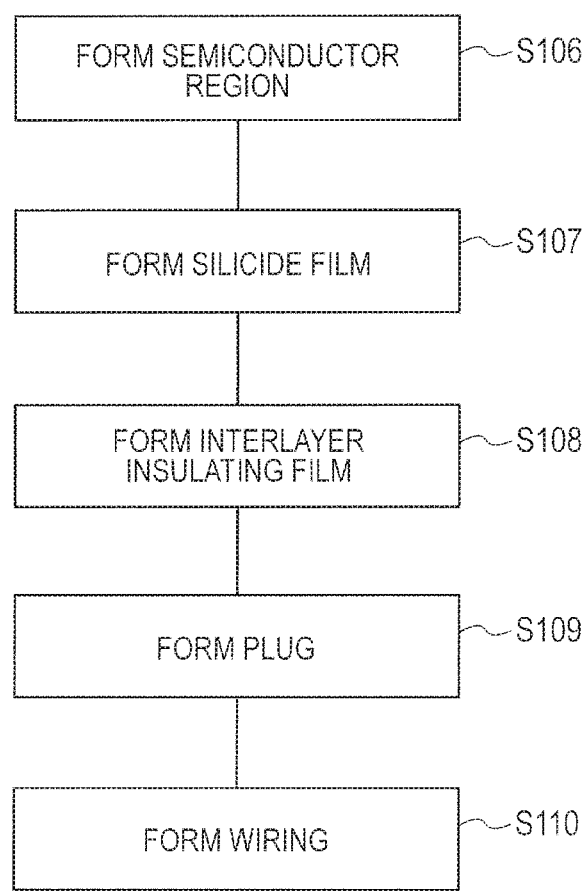
FIG. 13 is a flowchart illustrating the flow of a manufacturing process of the semiconductor device, after that of FIG. 12.

After this, as illustrated in FIG. 13, using an ion implantation method, the semiconductor region (NR1) matched with the sidewall spacer (SW1) is formed, and the semiconductor region (NR2) matched with the sidewall spacer (SW4) is formed (S106). A silicide film is formed over the surface of the semiconductor regions (NR1, NR2) and the surface of the gate electrodes (GE1, GE2) (S107). After an interlayer insulating film formed of a silicon oxide film is formed to cover the semiconductor substrate (S108), a plug penetrating through this interlayer insulating film is formed (S109). Then, wiring is formed over the interlayer insulating film through which the plug is formed (S110). In this manner, the semiconductor device in this embodiment 2 can be manufactured.

Accordingly, the present invention by the present inventors has specifically been described based on the embodiments. However, the present invention is not limited to the above-described embodiments. Needless to say, various changes may be made without departing from the scope thereof.

For example, in the above-described embodiment 1, the descriptions have been made to an example of forming a cell using two field effect transistors (Q1, Q2). However, the technical idea in the embodiment 1 is not limited to this. For example, the cell may be configured using three or more field effect transistors.

In the embodiment 1, for easy explanations, the descriptions have been made to a configuration, by way of example, in which insulation breakdown occurs in the gate insulating film of one field effect transistor, while insulation breakdown does not occur in the gate insulating film of the other field effect transistor. However, the technical idea in the embodiment 1 is not limited to this, and can widely be applied to the configuration in which insulation breakdown occurs strongly in the gate insulating film of the one field effect transistor, while insulation breakdown occurs at weakly in the gate insulating film of the other field effect transistor. This is because the resistance value of the gate insulating film with insulation breakdown strongly is lower than the resistance value of the gate insulating film with insulation breakdown weakly, thereby generating a difference between the read current flowing through the gate insulating film with insulation breakdown strongly and the read current flowing through the gate insulating film with insulation breakdown weakly.

The above-described preferred embodiments include the following example.

(Additional Note 1)

A semiconductor device including a plurality of gate insulating films having a manufacturing variation, the device including:
- an enhancement unit which enhances a resistance difference of the gate insulating films by causing occurrence of insulation breakdown resulting from the manufacturing variation in a part of the gate insulating films, more than a case in which insulation breakdown does not occur; and
- a peculiar information generation unit which generates peculiar information for identifying the semiconductor device, based on the resistance difference of the gate insulating films which is enhanced by the enhancement unit.

What is claimed is:

1. A semiconductor device comprising:
   a first field effect transistor; and
   a second field effect transistor,
   wherein the first field effect transistor includes:
      a first source region formed in a semiconductor substrate,
      a first drain region formed in the semiconductor substrate,
      a first channel region sandwiched between the first source region and the first drain region,
      a first gate insulating film formed on the first channel region, and
      a first gate electrode formed on the first gate insulating film,
   wherein the second field effect transistor includes:
      a second source region formed in the semiconductor substrate,
      a second drain region formed in the semiconductor substrate,
      a second channel region sandwiched between the second source region and the second drain region,
      a second gate insulating film formed on the second channel region, and
      a second gate electrode formed on the second gate insulating film,
   wherein the first gate electrode and the second gate electrode are electrically coupled to each other,
   wherein the first source region and the first drain region are electrically coupled to each other,
   wherein the second source region and the second drain region are electrically coupled to each other,
   wherein an insulation property of the first gate insulating film is broken down, and
   wherein a resistance value of the second gate insulating film is greater than a resistance value of the first gate insulating film.

2. The semiconductor device according to claim 1, wherein an insulation property of the second gate insulating film is not broken down.

3. The semiconductor device according to claim 1, wherein the first source region and the first drain region are electrically coupled to a ground, and
   wherein the second source region and the second drain region are also electrically coupled to the ground.

4. The semiconductor device according to claim 3, wherein the semiconductor device further includes a comparator having a first input unit, a second input unit, and an output unit,
   wherein the first source region and the first drain region are electrically coupled to the first input unit of the comparator, and
   wherein the second source region and the second drain region are electrically coupled to the second input unit of the comparator.

5. The semiconductor device according to claim 4, wherein a current flows from the first gate electrode to the first source region and the first drain region through the first gate insulating film broken down, by applying a read voltage to the first gate electrode and the second gate electrode which are electrically coupled to each other, thereby a first potential input to the first input unit of the comparator is greater than a second potential input to the second input unit of the comparator.

6. The semiconductor device according to claim 5, wherein the semiconductor device generates peculiar information for identifying the semiconductor device, based on an output result output from the output unit of the comparator.

7. The semiconductor device according to claim 1, wherein an withstand voltage of the first gate insulating film for insulation breakdown is lower than an withstand voltage of the second gate insulating film for insulation breakdown, and
   wherein a write voltage is applied to the first gate electrode and the second gate electrode which are electrically coupled to each other, thereby the insulation property of the first gate insulating film is broken down.

8. The semiconductor device according to claim 1, wherein the semiconductor device has an anti-fuse cell, wherein the anti-fuse cell includes
   the first field effect transistor, and
   the second field effect transistor.

9. The semiconductor device according to claim 1, wherein the field effect transistor is a depression transistor, and
   wherein the second field effect transistor is also a depression transistor.

10. The semiconductor device according to claim 1, wherein the first field effect transistor and the second field effect transistor are isolated by an element isolation portion formed in the semiconductor substrate.

11. The semiconductor substrate according to claim 1, wherein the semiconductor device includes
   a first word line extending in a first direction,
   a second word line arranged apart from the first word line in a second direction intersecting the first direction, and extending in the first direction,
   a first bit line extending in the second direction,
   a second bit line arranged apart from the first bit line in the first direction and extending in the second direction,
   a first cell arranged in an intersection region of the first word line and the first bit line,
   a second cell arranged in an intersection region of the second word line and the first bit line, and
   a comparator electrically coupled to the first cell and the second cell, and having a first input unit, a second input unit, and an output unit,
   wherein each of the first cell and the second cell includes
   the first field effect transistor, and
   the second field effect transistor, wherein the first source region and the first drain region of the first field effect transistor are electrically coupled to the first input unit of the comparator, wherein the second source region and the second drain region of the second field effect transistor are electrically coupled to the second input unit of the comparator, and wherein the comparator is used for read operation of the first cell and for read operation of the second cell.

12. A semiconductor device comprising:

a semiconductor substrate;

a first gate insulating film formed on the semiconductor substrate;

a first gate electrode formed on the first gate insulating film;

a first sidewall spacer formed on a first sidewall of the first gate electrode;

a second sidewall spacer formed on a second sidewall of the first gate electrode;

a second gate insulating film formed on the semiconductor substrate and arranged apart from the first gate insulating film;

a second gate electrode formed on the second gate insulating film;

a third sidewall spacer formed on a third sidewall of the second gate electrode;

a fourth sidewall spacer formed on a fourth sidewall of the second gate electrode;

a first semiconductor region formed in the semiconductor substrate and formed outside the first sidewall spacer; and a second semiconductor region formed in the semiconductor substrate and formed outside the fourth sidewall spacer, wherein the first gate electrode and the second gate electrode are electrically coupled to each other, wherein the second sidewall spacer and the third sidewall spacer are coupled, wherein an insulation property of the first gate insulating film is broken down, and wherein a resistance value of the second gate insulating film is greater than a resistance value of the first gate insulating film.

13. The semiconductor device according to claim 12, wherein an insulation property of the second gate insulating film is not broken down.

14. The semiconductor device according to claim 12, wherein the first semiconductor region is electrically coupled to a ground, wherein the second semiconductor region is electrically coupled to the ground, wherein the semiconductor device includes a comparator having a first input unit, a second input unit, and an output unit, wherein the first semiconductor region is electrically coupled to the first input unit of the comparator, and wherein the second semiconductor region is electrically coupled to the second input unit of the comparator.

15. The semiconductor device according to claim 14, wherein a current flows from the first gate electrode to the first semiconductor region through the first gate insulating film broken down, by applying a read voltage to the first gate electrode and the second gate electrode which are electrically coupled to each other, thereby a first potential input to the first input unit of the comparator is greater than a second potential input to the second input unit of the comparator and wherein the semiconductor device generates peculiar information for identifying the semiconductor device, based on an output result output from the output unit of the comparator.

* * * * *